July 13, 1937.  R. BURROWS  2,086,765
SPOTTING DEVICE FOR EYEGLASS LENSES
Filed Oct. 24, 1936
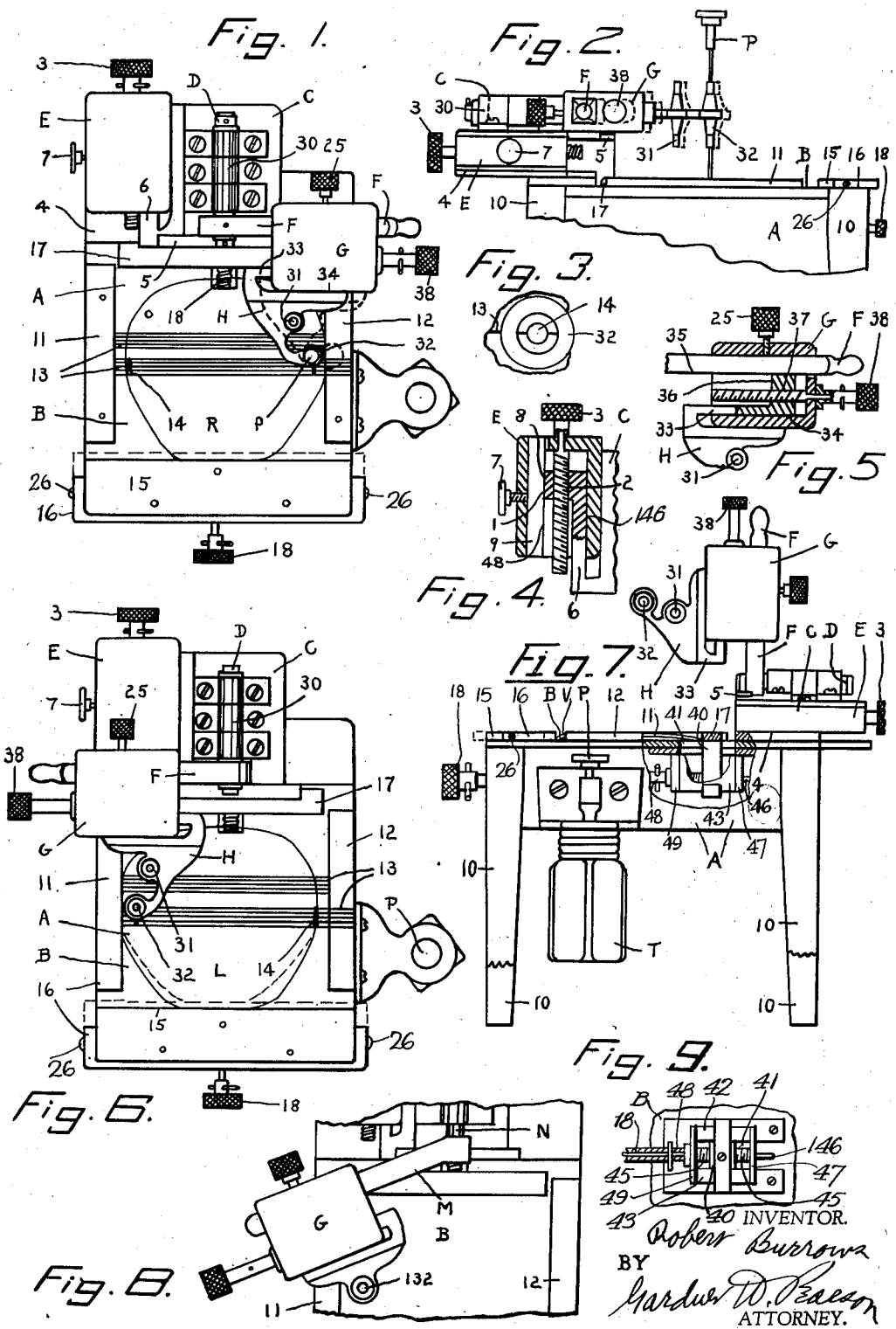

Patented July 13, 1937

2,086,765

UNITED STATES PATENT OFFICE 2,086,765

SPOTTING DEVICE FOR EYEGLASS LENSES

Robert Burrows, Lawrence, Mass.

Application October 24, 1936, Serial No. 107,335

3 Claims. (Cl. 33—174)

This invention is a device for marking the correct position of the holes for screws or bolts which must be drilled in the lenses of spectacles or eyeglasses of the rimless type before mounting on rimless mountings. Such holes for screws or bolts are used for attaching the nose bows or bows which go over the nose and for the ear bows or bows which go over the ears or for both.

These rimless lenses are often of irregular shape and it is highly necessary that the corresponding holes on the right lens should be in the same position with those of the left lens. If one is higher or lower than the other, or otherwise in the wrong position, one of the lenses should be ground down or else new lenses provided, as this difference often causes serious trouble to the user.

It is intended to be used after the right and left lenses have been ground and finished, and while particularly useful with lenses for rimless glasses which are of irregular shape, it can, of course, be used with lenses of regular oval or other similar shape.

The present usual procedure is to use one card for the right and one for the left lens, each card having horizontal guide lines and a series of spotting holes whereby the optician can place the right lens on the right card and locate the desired hole or holes, and then place the left lens on the left card locating the corresponding holes by means of the horizontal guide lines and the spotting holes. This method requires great care and is not accurate.

In the drawing, Fig. 1 is a plan view of my device with an eyeglass for the right eye in position to be marked.

Fig. 2 is a side elevation as from the left of Fig. 6.

Fig. 3 is an enlarged detail plan view showing how a spot is located through a sight tube.

Fig. 4 is a detail of the main slide adjusting box with the top removed and part in section.

Fig. 5 is a plan view in section of the guide box with the top removed.

Fig. 6 is a plan view similar to Fig. 1 showing an eyeglass for the left eye in position to be marked and in dotted lines, a short drop lens and the swing guide in place.

Fig. 7 is an elevation as from the right of Fig. 6 with the swing arm held in a vertical position and with a short drop lens in place.

Fig. 8 is a plan detail view of a modification of the swing arm and shaft.

Fig. 9 is a detail of the front guide and operating screw.

A represents a frame which, as shown, is carried by four supporting legs 10, 10, 10, 10 and which carries a work supporting bed B of a suitable size to support a lens such as R between the two fixed parallel side guides 11 and 12.

This bed B is also preferably provided with parallel transverse or horizontal gauge lines 13, such as are generally used by opticians, and with one or more sight spots which are preferably holes, indicated at 14. The spots or holes 14, as shown, are positioned near each end of each line and these lines and spots are suitably positioned to show the correct place for certain drill holes for the screws of the mountings.

For convenience, I will refer to direction from right to left as width and from front to back as height because lenses in glasses are used in a vertical position, and it is obvious that the bed B might be held in a vertical position or in any other position as well as horizontal and the frame might be used with or without legs.

Bed B is perfectly flat and at the front is a straight guide bar 15, the guiding edge of which is at an exact right angle with the surface of bed B, and with the inside faces of side guides 11 and 12.

For convenience in aligning what are known as short drop lenses, I also prefer to provide a swinging guide bar 16 which can be swung over on its pivots 26, 26, as shown in dotted lines in Fig. 6 and in full lines in Fig. 7, back of guide 15. When not used as a guide for a short drop lens, bar 16 can be swung forward out of the way. At the back is a sliding guide bar 17 exactly parallel with front guide 15 which can be moved forward and back by a thumb screw 18, as desired.

Guide bar 17 is rigidly carried by a lug 40 which goes through a slot 41 in bed B and is guided between guides 42, 43. It is threaded to engage the threaded part 45 of screw 18 which is kept in place by its reduced end 146. This reduced end 146 passes into a block 47 and sleeve 48 engages a block 49, whereby as blocks 47 and 49 are fixed to the bottom of bed B, by turning screw 18, lug 40 carrying guide bar 17 can be moved back and forth.

E is a guide box fixed to the top of frame A, back of bed B and, as shown, at one side. Box E has top, bottom, sides and back, but is open at the front. The inside face 46 of one side, shown as the right hand side, is exactly parallel with sides 11 and 12 and at right angles to front guide 15 and back guide 17 and serves as a guide for the inside of a guide arm 6 which carries what I will call the main slide C.

Guide arm 6 is shown as having a projection 1, the left hand face 8 of which is exactly parallel with the right hand face 46 and the right hand face 48 of a guide bar 9 which, as shown, is a rectangular bar which can be moved from right to left by means of an adjusting screw 7 to take up any slack. Guide arm 6 can, therefore, slide between faces 46 and 48.

Through this projection 1 is a threaded hole 2 for an adjusting screw 3 which passes through the back of guide box E. By means of this screw 3, the main slide C can be moved directly forward and back exactly parallel with the side guides 11 and 12, and as its bottom face rests on the top guiding surface 4, at the top of frame A, which lies in a parallel plane with the surface of bed B, slide C can be moved accurately forward and back, carrying with it the bearings 30 for a short shaft D, the axis of both of which is positioned exactly halfway between the inside faces of guides 11 and 12 and in parallel alignment so that as this shaft moves forward and back with the slide, it is always exactly the same distance from each side guide 11 and 12.

Guide box G is carried by a swing arm F rigidly carried by shaft D and the marker carrier H is slidable from right to left by means of a guide arm 33.

Box G has a top, bottom, sides and back and the back face 34 of the front side serves as a guide for one side of guide arm 33, being exactly parallel with the front and back guides 15 and 17 so that carrier H can slide from left to right in a direction always parallel with these front and back guides.

Arm 33 carries an extension 36, the back face of which engages the front face 35 of arm F, this front face and all the other parts being arranged so that when carrier H is moved from right to left by means of the adjusting screw 39 which passes through the threaded hole 37 in extension 36, the two vertical sighting or pin tubes 31 and 32 will always be perpendicular to the plane of the top surface of bed B. Screw 25 is to take up any slack or looseness between guide faces 34 and 35.

The top and bottom faces of arm F and the top and bottom faces of box G should be at equal distances from the axis of shaft D and there should be a stop or rest 5 for box G so that when the arm is thrown from one side to the other, the tubes 31 and 32 will always be exactly vertical.

By means of the adjusting screws 3 and 38, either tube 31 or 32 can be brought directly over the spotting hole 14 which is in the position in which one screw for a mounting hole is to be bored. This can be roughly determined by looking through the tube and exactly determined by dropping through the appropriate tube, a marking pin P. This pin has a shank which fits snugly in either pin tube and terminates in a point. By dropping this pin through a tube and then adjusting, it positions the tube exactly right for spotting one hole.

Fig. 3 shows the sighting and Fig. 1 shows pin P in place. Fig. 3 shows how by looking through a tube 31 or 32, it can be located so that its axis will point exactly at the spot or hole 14 to be marked for the center of the screw hole.

Bottle T holds ink and the pin P.

The pin is removed, a right lens such as R put in place with its right edge against right guide 12 and its bottom edge against front guide 15, the point of pin P is dipped in ink and the pin is then dropped through the tube, the ink on the point making a small but distinct spot for drilling.

The right lens R can then be removed and a left lens L put in position with its bottom edge at the front guide 15 and its left edge against left guide 11, the arm swung over and pin P with its point dipped in ink dropped through the tube in the opposite direction, the result being a spot on that lens in exactly the same position as on the right lens.

The tubes 31 and 32 can be so positioned that they correspond with the relative locations of the ear screw hole for the right lens and the nose screw hole for the left lens, and for the ear screw hole of the left lens and the nose screw hole for the right lens.

Where the lenses are of certain shapes, this can be done and it is necessary only to locate one of the four holes, the others being marked automatically. In any case, however, when a hole in one lens is located, the other corresponding hole in the other lens can instantly be marked.

The front swing guide 16 is used with certain short drop lenses and the back guide 17 is used with lenses of which the top is a relatively straight line.

As shown in Fig. 8, only one tube 132 can be used but in every case, the sighting and marking pin tube should be at an exact perpendicular to the surface of bed B.

As also shown in Fig. 8, a swing arm M which is carried at an obtuse angle by a central shaft N, may also be used but in every case such a shaft D or N should be parallel to and midway between the fixed side guides such as 11 or 12.

I claim:

1. The combination in a lens spotting device of a frame; a bed carried thereby which is provided with gauge lines and sight holes on its surface and has fixed parallel side guides, a front guide, and a back guide which is adjustable forward and back; a main guide slidable and adjustable forward and back parallel with the side guides; shaft bearings carried by the main guide and having an axis, the extension of which axis is parallel to and midway between the side guides; a shaft turnable in the shaft bearings; a swing arm fixed to and carried by the shaft at a right angle thereto; a guide box carried by the swing arm; a marker carrier slidable in the guide box and adjustable from left to right along the swing arm; two vertical pin tubes carried by the marker carrier and positioned at right angles to the swing arm; and a pointed marking pin which passes through one of the pin tubes.

2. The combination in a lens spotting device of a frame; a bed carried thereby which has fixed parallel side guides, a front guide, and a back guide; a main guide slidable and adjustable forward and back parallel with the side guides; shaft bearings carried by the main guide and having an axis, the extension of which axis is parallel to and midway between the side guides; a shaft turnable in the shaft bearings; a swing arm fixed to and carried by the shaft at a right angle thereto; a marker carrier slidable and adjustable from left to right along the swing arm; two vertical pin tubes carried by the marker carrier and positioned at right angles to the swing arm; and a pointed marking pin which passes through one of the pin tubes.

3. The combination in a lens spotting device of a frame; a bed carried thereby which has fixed parallel side guides and another guide at right angles between them; a main guide slidable and adjustable forward and back parallel with the side guides; shaft bearings carried by the main guide and having an axis, the extension of which axis is parallel to and midway between the side guides; a shaft turnable in the shaft bearings; a swing arm fixed to and carried by the shaft at an angle thereto; a marker carrier slidable and adjustable along the swing arm; a vertical pin tube carried by the marker carrier; and a pointed marking pin which passes through the pin tube.

ROBERT BURROWS.